United States Patent [19]  
Harkin

[11] 4,021,338  
[45] May 3, 1977

[54] METHOD FOR TREATING SEPTIC TANK EFFLUENT SEEPAGE BEDS AND THE LIKE

[75] Inventor: John M. Harkin, Madison, Wis.

[73] Assignee: Wisconsin Alumni Research Foundation, Madison, Wis.

[22] Filed: Nov. 8, 1976

[21] Appl. No.: 739,979

Related U.S. Application Data

[63] Continuation-in-part of Ser. No. 602,764, Aug. 7, 1976.

[52] U.S. Cl. .............................. 210/63 R; 210/18; 61/13
[51] Int. Cl.² ................... E02B 11/00; C02B 1/34; C02B 3/08
[58] Field of Search ............. 210/15, 18, 50, 63 R; 61/13

[56] References Cited

UNITED STATES PATENTS

| | | | |
|---|---|---|---|
| 1,677,153 | 7/1928 | Spencer | 61/13 |
| 2,768,949 | 10/1956 | Hewey | 210/63 R |
| 2,805,989 | 9/1957 | Greer | 210/18 |
| 3,113,924 | 12/1963 | Mendius | 210/63 R |
| 3,335,082 | 8/1967 | Ullrich | 210/18 |
| 3,422,010 | 1/1969 | Case | 210/50 |
| 3,454,427 | 7/1969 | Suzuki | 210/50 |
| 3,477,947 | 11/1969 | Kappe | 210/3 |
| 3,564,854 | 2/1971 | Berthold | 61/13 |
| 3,705,098 | 12/1972 | Shephard | 210/63 |
| 3,914,173 | 10/1975 | Call | 210/63 |

OTHER PUBLICATIONS

Proceedings of the 21st Industrial Waste Conference, May 3, 4, and 5, 1966, Purdue University, Lafayette, Indiana, "Hydrogen Sulfide and Methyl Mercaptan Removals with Soil Columns," pp. 172–191.

*Primary Examiner*—Frank A. Spear, Jr.
*Assistant Examiner*—Ernest G. Therkorn
*Attorney, Agent, or Firm*—Howard W. Bremer

[57] ABSTRACT

A method for correcting and preventing the failure of septic tank effluent seepage beds or similar installations which comprises treating such beds with a solution of an oxidizing agent, preferably hydrogen peroxide.

3 Claims, No Drawings

METHOD FOR TREATING SEPTIC TANK EFFLUENT SEEPAGE BEDS AND THE LIKE

This application is a continuation-in-part of application Ser. No. 602,764, filed Aug. 7, 1975.

This invention relates to an improved method for treating septic tank effluent seepage beds and like installations.

More particularly, this invention relates to a method for treating such installations which have failed through clogging, whereby the seepage or leach bed is "opened up" to again permit purifying percolation of effluent through the bed.

This invention also relates to a method for prophylactically treating septic tank effluent beds or the like to prevent failure through clogging.

Safe and effective management of wastewaters discharged from single and multiple family dwellings, motels, restaurants, campsites, ski resorts and similar living units or establishments remote from central municipal sewerage systems is a major problem in many areas of the world. Treatment systems involving anaerobic digestion of the raw wastes in a septic tank followed by disposal of the septic tank effluent in a soil absorption/purification seepage bed are now almost exclusively used for on-site disposal of wastewaters in unsewered areas. Occasionally, other devices, such as aerators, sand filters, or biological discs, are interspersed between the tank and the bed to prepurify the tank effluent (e.g. by B.O.D. reduction or suspended solids removal) beore it is admitted to the seepage bed.

It is well known, however, that simple or adapted septic tank/soil seepage systems are sometimes ineffective in preventing public health hazards and nuisances because of the failure of the systems to function in the intended fashion. Localized septic tank system failures have sometimes been condoned where they have occured in rural areas with low population density. With the rapid growth of high-density suburban, summer-home, and recreational communities in unsewered areas, however, failure of septic systems cannot be tolerated because of the public health hazards engendered by potential surface and drinking water contamination resulting from such failures.

Household wastewaters are recognized as containing fecal and occasionally pathogenic bacteria, putrescible organic materials, high loads of inorganic and organic plant nutrients, particularly compounds of nitrogen and phosphorus, and, on occasion, infectious viruses. Household sewage can thus cause serious health and environmental problems if released to surface or groundwater without prior purification. In areas remote from large-scale municipal sewage treatment plants, underground septic tank-soil seepage bed systems can be used to effect satisfactory purification, provided the systems are properly designed, installed and maintained in appropriate soils. In suitable systems the septic tank prevents the bulk of waste solids suspended in the wastewater from reaching the soil absorption field and rapidly clogging the soil pores. In the tank, heavier solids sink to the bottom as a sludge and are decomposed by anaerobic microorganisms, while grease and lighter solids form a floating scum. The liquid component of the wastewaters, clarified by such settling and flotation, gradually flows from the tank at a point intermediate the sludge and floating layers and is distributed through a system of perforated pipes located underground in a series of trenches filled with gravel, to spread the effluent evenly over a large disposal area in the soil. This latter disposal area is referred to as a seepage bed or leach or absorption field. The septic tank effluent still contains small amounts of suspended solids, dissolved putrescible solids, bacteria/virus, and soluble plant nutrients. In a properly functioning seepage bed, the soil pores filter out the residual suspended solids, bacteria and virus as the liquid drains or percolates through the soil. At the same time the bulk of the dissolved organic compounds are decomposed aerobically and/or anaerobically by soil microorganisms. Phosphates in the effluent are generally efficiently retained in the soil, e.g. by absorption on clay particles, while nutrient nitrogenous compounds are normally oxidized to nitrates, which tend to drain away into the groundwater or be partially decomposed to elemental nitrogen under anaerobic conditions by denitrifying bacterial. With the exception of nitrate, a properly functioning absorption field almost completely purifies the septic tank effluent before the water reaches the underground water table or aquifer.

Some soils are unsuitable for septic tank-soil disposal systems. The rate at which water seeps through the soil (the so-called percolation rate) mate be too slow, or the slow cover (depth) above highly permeable, creviced bedrock or a high water table may be too thin, or the slope of the terrain may be too steep, or the site may be located on a river flood plain subject to seasonal inundation. In some problem areas soil can be heaped up into a mound to create an artificial purification bed which allows adequate purification. In such installations, effluent from the septic tank is pumped up into a distribution system in the mound, which functions like a normal subsurface seepage bed in conventional systems.

However, even with well designed systems, properly installed on suitable soils, failures can and do occur. Such failures are generally caused by the inability of the soil to conduct away water from the tank effluent at an adequate rate - a problem which is greatly enhanced in the modern household through the use of automatic water-using appliances such as water softeners, dishwashers and washing machines. As a result, either effluent surfaces and contaminates the area around the seepage bed, possibly also polluting surface waters, or the septic tank may overfill with water and the system may back up inside the house or buildings being serviced.

The reduction in the rate of water seepage through the soil purification bed may be due to one or more of several factors, including: (1.) blockage of capillary pores in the soil by particles of suspended solids filtered from the septic tank effluent; (2). blockage of soil pores by the cells of soil microoganisms growing on the dissolved and suspended organic matter present in the effluent; (3.) deposition of microbial metabolites, especially bacterial polysaccharide slimes and gums, in the seepage bed; (4.) precipitation of insoluble heavy metal sulfides in anaerobic portions of the bed; and (5.) gas locks due to nitrogen, methane or other gases released in the bed. These contributing factors, in combination or progression, can cause failure of the system.

Before a septic system is installed, soil surveys are generally made to determine whether the site is amenable to such systems and a percolation test is run to determine whether the soil will permit liquid to move out of bed of reasonable dimensions at a rate commensurate with projected needs. When a newly installed system begins to operate, the tank effluent will usually drain away rapidly from the seepage bed while efficient purification takes place through the filtering action of the soil, decomposition of the organic contaminants by aerobic soil microoganisms, and fixation of plant nutrient elements by adsorption processes and conversion to microbial biomass in the bed. As filtration of intractable organic solids and proliferation of bacterial cells proceeds in the bed, a gradual initial blocking of the soil capillaries occurs, so that the system does not drain as fast as it did in its virgin condition. As a result, air cannot be drawn into the soil in a quantity sufficient to maintain an adequate rate of aerobic decomposition of incoming organic materials. Such air is the only source of oxygen in the bed, there being no dissolved in the septic tank effluent since it has emerged from a completely anaerobic fermentation zone. Consequently, continuously ponded anaerobic zones tend to develop in the seepage bed. Some decomposition of organic matter by anaerobic microorganisms still goes in these zones, but layers resistant to flow begin to develop in the bed as fresh suspended organic materials from inflowing tank effluent are deposited in the bed, microbial cells proliferate, and excretion of solid microbial metabolites continues, to the point where these actions predominate and ultimately cause formation of impenetrable crusts or clogged zones. The anaerobic conditions particularly promote the formation of bacterial slimes and gums and the reduction of sulfates in the effluent to sulfide, with the result that black insoluble heavy metal sulfides precipitate in the blocked, clogged, or crusted zones. The extent of such blackened regions depends upon the hydraulic head on the bed and on the length of time over which the anaerobic condition has prevailed. The formation of sulfides also interferes with microbial conversion of wastes in the bed since sulfides are toxic to many species of microoganisms. Also, precipitation of insoluble sulfides may tie up in unavailable form some race elements, such as iron, manganese, or copper, needed by some soil microbes for the synthesis of enzymes essential to maintain normal growth and metabolism.

For many decades, and perhaps as long as reasonably modern septic systems have been available, all sorts of nostrums have been suggested to combat or cure system failure. For the most part these nostrums have consisted of strong bases, strong acids, detergents, surfactants, bacterial inocula, yeast inocula, fungi inocula and enzymes. The Government's "Manual of Septic Tank Practice" teaches that thousands of such nostrums have been marketed. None of these has, however, proved to be efficacious in "opening up" a clogged septic tank leach field. The Manual consequently warms against the use of such materials since they often compound rather than alleviate the problems of soil clogging and system failure.

Prior to the present invention, possibly the most reliable remedy one could prescribe in an attempt to cure a failed system is to stop using it. Sometimes the short rest that can be achieved by pumping out the contents of the septic tank will help revive a failed system since it generally takes a few days before a properly dimensioned tank refills and during this time, ponded water may slowly seep away through small unclogged portions of the bed, readmitting air to the anaerobic clogged zones. As air reenters these regions, the anaerobic organisms are killed off, because they cannot tolerate oxygen. The chemical species formed during this process, the oxygen ion or superoxide radical (see I. Fridovich, Accounts of Chemical Research, 5(10) —321–326 (1972)) reoxidizes a portion of the black sulfides to sulfates, causing some brightening of the dark zones, and aerobic bacterial decomposition of the wastes clogging the bed may be stimulated. (See P. H. McGauhey, R. B. Krone, Soil Mantle As A Waste Water Treatment System, SERL Report No. 67-11, University of California Berkeley, 1967.)

However, unless the resting period is long enough, the bed is not adequately reaerated to rehabilitate it. In practice, the amount of insoluble sulfide that is oxidized on resting the bed is limited since there are only sufficient anaerobes in the bed to form only limited amounts of superoxide radical. Also, to permit air to be admitted to the bed water must drain from it during resting, the subsequent moisture regime in the soil may not be optimum for decomposition of residual organics by aerobic organisms. Therefore, development of anaerobic conditions and clogged/crusted layers in the bed recurs very rapidly when the system is returned to operation and recurring failure due to clogging/crusting followed resting of a bed takes place much faster than with a freshly constructed bed. Also, in practice, it is usually impractical to interrupt the use of a septic system for long enough to provide a satisfactory resting period in order to allow rejuvenation or recovery of a failed seepage bed.

It has now been found that failed septic tank seepage beds can be again made functional by treating them with certain chemical oxidizing agents. Such treatment can also be effectively applied to similar wastewater treatment systems, such as dry wells, sand filters, or sand or soil beds used for treatment of sewage or effluents.

Theoretically, any chemical oxidizing agent, whether in solid, liquid or gaseous form could be used for the purposes of this invention. However, many have been found to be inoperative for such purposes and the use of others is militated against because of practical considerations.

For example, U.S. Pat. No. 2,768,949 discloses a method for treating clogged underground sewage drain systems utilizing a decomposing acid (sulfuric acid or phosphoric acid) to solubilize clogging material and optionally enhanced by an ammonia reagent (ammonium hydroxide) or a strong oxidizing agent such as potassium permanganate. All of these chemicals are applied in accordance with the teachings of this patent by drilling holes (as preferably by hydraulic nozzle means) into the clogged formation and filling the chemicals into the holes. Physical break-up of the clogging materials by such hydraulic nozzles is also advocated.

It is clear from the disclosure of U.S. Pat. No. 2,768,949 that it contemplates "so treating the accumulated clogging material within the chamber and formation as to disintegrate and decompose it - - - ". Inasmuch as the primary treating agents are strong acids, sulfuric and phosphoric, the obvious intent is to dissolve the clogging materials by acid-catalyzed chemical reaction. As a matter of fact, only a small fraction of the clogging materials can be dissolved by such acids since many of the organic compounds present in clogged solid are not prone to acidic hydrolysis. Moreover, strong mineral acids, such as sulfuric, phosphoric and nitric acid, particular when applied in undiluted form, drastically alter the pH of the soil, making it unsuitable to support growth of the heterotrophic bacteria that normally destroy the organic wastes and fix the inorganic nutrients present in septic tank effluent. In effect, they would destroy the natural condition of the soil and render it ineffective as a medium for biological purification and renovation of waste waters. They are, therefore, environmentally unacceptable.

In addition, and regardless of dilution, sulfuric and phosphoric acid would liberate hydrogen sulfide in free gaseous form from the copious deposits of insoluble metal sulfides present in the clogged soil — a gas which is not only toxic to humans and other higher life forms but also to soil microorganisms and would, therefore, further reduce the biological activity in the soil surrounding the acid-treated systems.

It should also not be overlooked that the strong mineral acids would react vigorously with carbonates in calcareous soils as well as with crushed limestone which is frequently used as the gravel medium in leach field beds — reactions which could not only be deleterious but even hazardous — and that excess acid could be leached from the soil and adversely effect ground water quality. Phosphoric acid presents the additional complication of the potential formation of gelatinous precipitates of certain phosphates, e.g. calcium or iron phosphate, which might increase rather than decrease the clogging in the treated soil, while nitric acid poses the danger of ground water contamination with ntrates.

The use of a strong oxidizing agent, such as potassium permanganate, as an adjunct to the acid treatment, as suggested in U.S. Pat. No. 2,768,949, will not alleviate or offset the deleterious effects of the primary strong mineral acid treatment and, as a practical matter, are too expensive to use.

None of the acidic reagents taught by U.S. Pat. No. 2,768,949 leave the soil in a fit condition for the desired natural physical-biological purification of waste waters by a vigorous mixed soil bacterial population.

Certain other well-known oxidizing agents suggest themselves for purposes of this invention but as a practical matter are unsuitable. For example, chlorine and oxychlorides would appear to be readily usable in solution form. However, such agens are highly toxic to microoganisms and would also tend to chlorinate the organic matter in the seepage bed, creating chlorinated organic compounds which are more resistant to biological degradation, or, perhaps, chloramines, which are highly toxic and assumed to be carcinogenic.

Still other inorganic or organic peroxides, such as sodium peroxide, t-butyl hydroperoxide, or peroxyacetic acid could also conceivably be used for the purposes of this invention. These would, however, not be preferred compounds because of the possibility of creating undesirale pH changes in the seepage bed and because of cost considerations.

In particular contrast to the acid treatment prescribed in U.S. Pat. No. 2,768,949, the process of the present invention, a simple treatment with hydrogen peroxide, is designated to stimulate the natural biological breakdown of clogging substances with minor chemical action while the treating agent decomposes into environmentally harmless components. Presumably gaseous oxygen or ozone could be used in the process of the present invention instead of hydrogen peroxide. These agents are, obviously difficult to inject into and distribute through the soil bed and are therefore not practical alternatives to the treating agent of choice, hydrogen peroxide.

When applied to a clogged seepage bed in accordance with this invention, hydrogen peroxide oxidizes the bulk of the insoluble sulfides present in the clogged bed to harmless sulfur, soluble sulfates, and other oxysulfur anions, thereby destroying the toxic sulfides and releasing the heavy metal trace elements to the soil solution for microbial use. Some of the peroxide may decompose to water plus oxygen, either catalytically on soil particles or by heavy metal ions brought into solution by the oxidation of insoluble sulfides, or through enzymatic decomposition by catalases produced by organisms present in the bed. The free oxygen causes considerable turbulence in the bed, which loosens up the soil particles and pores, especially in the organically matted clogged area, and mechanically improves the distribution of the chemical throughout the bed and the permeability of the soil. The free oxygen can also be reduced in part to oxygen radical anions by the anaerobic bacteria in the bed, and so its efficacy is multiplied. Some direct chemical oxidation of the clogging organic matter by peroxide, oxygen, or oxygen ion radicals may also occur, promoting destruction or solubilization of these obstructing compounds, e.g. by introduction of polar oxygen functions such as carboxylic acid groupings. Biological decompositions of the organic materials in the bed aerobic organisms is also stimulated. The combination of these effects rapidly restores permeability to clogged and crusted regions of the bed, returning the bed to the status of intermittent drainage typical of a freshly constructed bed.

The hydrogen peroxide treatment can be carried out in various ways, depending upon the condition of the system being treated but to be fully effective the peroxide should reach the clogged, crusted anaerobic portions of the bed. The efficacy of the treatment is therefore reduced both by dilution and by inaccessibility of target areas if the peroxide is added to a bed which is standing full of water, such as is present in many failed systems. Preferably this water should be pumped out, and disposed of safely, and replaced by peroxide solution. The peroxide is thus given the opportunity to reach the areas which are sealed and which were supporting the water being held in the bed. Alternatively, the septic tank can be pumped out, allowing a few days' respite to the bed. During this time, the bed may drain sufficiently by natural percolation. The emptied tank can also be used as a temporary or intermediate holding facility for water subsequently removed from the bed. After the bed has been drained, peroxide is added to the bed either immediately or shortly before fresh effluent begins to spill over again from the tank. A combination of bed and tank pumping can also be carried out.

Prevention of failure is, of course, preferable to correcting failure. Thus, as another embodiment of this invention, peroxide treatment can be used to forestall failure of the system. Such prophylactic treatment can be readily performed as part of routine service or maintenance of the septic system. Septic tanks must be pumped out occasionally to remove the solid sludge that gradually accumulates on the bottom of the tank, otherwise large charges of solids spill over into the distribution pipes and disposal bed and cause rapid clogging of the whole system. According to the present invention, when practiced for prophylactic purposes, whenever a tank is pumped out, the bed should be allowed to drain naturally for the few days, until the liquid in the tank has almost reached the effluent exit port, and hydrogen peroxide then added to the bed to rejuvenate the bed by removing any crusts that have been building up. This prophylactic treatment can restore the permeability of the bed to its virginal condition. Alternatively, hydrogen peroxide can be added to the bed while the tank is being pumped out or any time after it has been emptied.

The peroxide can be introduced into the system by any of a variety of methods. It can be injected at one point or at several spots distributed throughout the bed using probes similar to oversize injection needles. It is much simpler to pump, pour or siphon a hydrogen peroxide solution down the vent pipes normally located at the ends of distribution lines or into the distribution box or manifold located at the start of the distribution system. Special pipes can also be provided in beds to serve as a distributing line for hydrogen peroxide treatments. Alternatively, holes can be augered down through the backfill to the top of the gravel and temporary pipes, e.g. 3" plastic pipe, inserted for introducing the peroxide to one or several areas along the bed.

The amount and concentration of peroxide needed is highly variable depending upon the size and state of the system being treated. Any grade of peroxide is suitable, but stabilized technical grades are normally preferable. The concentration of the stock solution used is determined merely by convenience in shipping and handling. Normally a 30–65% concentration is convenient for use. The stock solution can be appropriate diluted with water before, during or after application to the bed. In any event, excess hydrogen peroxide is not harmful to the soil organisms - it merely decomposes, either catalytically on soil particles on enzymatically by microbial catalases, giving water and oxygen which promotes aerobic decomposition of organic matter in the soil bed.

It has been found that for prophylactic treatments of bed characteristic to single family living units, 1–5 gallons of approximately 50% hydrogen peroxide solution is usually adequate while for treatment of such a system that has failed, i.e. a system that has become completely sealed by the clogging/crusting phenomenon, 15–30 gallons of 50% hydrogen peroxide solution is normally sufficient. Larger or smaller amounts may be required for other systems, depending on their size, the extent and severity of the clogged zones, and the length of time for which the system has been clogged. The volumes and concentrations specified above and in the following Examples should not be considered, therefore, to constitute any limitation of the present invention. Any volume or any concentration of hydrogen peroxide or other peroxidic oxidizing agent added to a septic tank effluent or other wastewater disposal system for purposes of avoiding clogging and crusting of the soil or sand present in the treatment system, or for remedial treatment of systems that have failed because of crusting clogging or sealing of the soil seepage bed is to be considered an embodiment of the present invention. The extent, duration and mode of the treatment by the oxidizing agent can be readily adjusted to the requirements in a given situation.

EXAMPLE 1

A series of polyvinyl chloride columns 75 cm long and 10 cm in inner diameter were capped at their lower ends. A short half-inch diameter tube fitted with a stopcock was sealed into each cap. The top of each column was fitted with a threaded collar into which a cap fitted with a short plastic nipple could be screwed.

Each column was filled with 60 cm of coarse sandy soil, the upper surface of the sand being covered with coarse gravel or a glass wool mat to prevent agitation of the surface particles when liquid was added to the tubes. The caps were screwed on, using teflon tape to ensure a good seal, and connected to a reservoir via a tubing manifold. The soil columns were used to simulate cross-sections or cores of a septic tank effluent disposal field on a highly porous soil or a mound system with sandy fill. Septic tank effluent from a conventional treatment facility was intercepted before entering a conventional disposal field and trapped in an underground holding tank, from which liquid was removed weekly by pumping into 5 gallon containers, which were brought back to the laboratory and stored at 5° C in a cold room or refrigerated chest. Charges of effluent (1.7 gallons) were added daily to each column under a hydrostatic head of 5–80 cm of liquid. The columns were kept constantly ponded by opening the stopcocks only while additions were being made and closing them before all the liquid drained from the top of the column. This procedure maintained the columns in a continuously anaerobic condition, simulating conditions in a seepage bed which is beginning to fail because of retarded percolation. In time, the flow rates of liquid through each column with the stopcock fully open became gradually slower until after 90–100 days flow with the stopcock open finally ceased or had fallen to a few milliliters of liquid per hour, even under the highest hydrostatic heads. This was due to clogging of the soils pores in the column. A 30% aqueous solution of hydrogen peroxide was then poured in 50 milliliter increments into the ponded liquid on top of test columns, until totals of 50, 150, and 250 ml had been added. Other columns remained untreated as controls. Unclogging by the peroxide generally resulted within a few hours. As the treated columns unclogged, the flow rates increased to 450 to 3000 ml per hour under only 10 cm hydrostatic head.

The initial effluents from the unclogged columns were green-blue in color and contained oxysulfur salts of iron, manganese, nickel, copper, magnesium, and other cations. The total organic carbon content of the glass wool covers (5–15% C in control columns) and in the upper (0–1, 1–2, and 2–3 cm depth) soil layers (0.50–0.85% in control columns) were reduced to about half of these values after flushing with the normal daily dose of effluent following peroxide treatment. The slimy appearance and feel of coatings on the gravel and on the uppermost crusted surface of the sandy soil disappeared. High percolation rates were restored in both sealed and seriously clogged columns.

EXAMPLE 2

A battery of plexiglass columns 90 cm long and 10 cm in internal diameter were sealed at the lower end with coverplates fitted with plastic nipples and tygon tubing equipped with pinchcocks at the botton end and provided with snugly fitting, but removable nippled covers at the tops. Each column was filled with 75 cm of medium grained sand covered with 10 cm of coarse gravel, to simulate cores through a conventional septic tank effluent seepage bed or mound fill system. Daily doses of 0.15–1.7 gallons of effluent were added to each column as described above. A black layer started to form at the top surface of the sand within a few days.

Blackening proceeded down the whole length of the columns as daily dosing was continued, while the blackening at the top layers increased in intensity. In time, the flow rates through the columns with the pinchcocks open were dramatically decreased or reduced to zero, that is, the soil pores in the columns were badly clogged or completely sealed. There was an intensely black crust at the top surface of the sand in each column. When 50 ml of 30% hydrogen peroxide was added to ponded effluent at the top of sealed columns, the reagent began to brighten the black color and to erode into the clogged/crusted surface. Effervescence and frothing mechanically churned up the surface layers. In time the reagent gradually ate its way down into lower layers of the column. If the reagent seemed expended, a further addition of 50 ml of 30% $H_2O_2$ was made. Within a few hours, breakthrough was achieved, even in sealed columns, and effluent began to flow again. As before, the first liquid to emerge from the columns was green-blue and contained inter alia sulfates of Fe, Mn, Ni, Cu, Mg, etc. Final flow rates of 0.5-3.0 liters per hour were achieved with 50-250 ml of 30% $H_2O_2$ within 3-14 hours. When the gravel covering some columns was carefully removed and hydrogen peroxide was injected through a long syringe needle into lower layers of the sand in some test columns, almost instant brightening of the color occurred, due to the rapid chemical oxidation of black insoluble transition metal sulfides to their colorless or only lightly colored, soluble sulfates (or other oxysulfur salts). The levels of insoluble sulfides are much lower at deeper levels in the column than at the upper crusts, so that brightening proceeds much faster. When peroxide was injected into subsurface portions of the column, some of it started to decompose catalytically in the columns. The oxygen released bubbled to the surface, causing agitation of the soil and ruptions in the surface layer, stirring up the surface and creating channels that accelerated spread of the reagent and flow of effluent through the soil. However, both methods of treatment (simple addition or injection) removed the clogged/crusted condition of the columns and restored fast percolation rates.

The foregoing example suggests that there could be advantages in injecting peroxide directly into the seepage bed soil. As a practical matter this is difficult in field installations because of the gravel backfill covering the soil. However, well-drilling probes (sand points) or similar stiff, small-diameter hollow pipes can be used to penetrate the gravel layer and inject peroxide directly into the crusted/clogged portions of the bed.

EXAMPLE 3

A seepage field belonging to a household septic system was treated as described below. This system had failed to the point that the whole underground disposal field was apparently completely or almost completely sealed as evidenced by the fact that whenever water was used in the house, septic tank effluent fountained out of a vent pipe above the distribution box and ran downhill onto an adjoining alfalfa field. The disposal field was installed in glacial till, a soil type which exhibits very high percolation rates. Failure of the system was therefore undoubtedly due to the biological clogging/crusting phenomenon. A pit (ca. 5 × 4 feet) was carefully dug alongside the seepage bed close to the distribution box to a depth below the bottom of the ponded water. A small hole was then burrowed laterally underneath the bed. A soil moisture tensiometer was inserted into this hole underneath the bed, and the pit was refilled. Three other vertical holes were made with a post hole digger laterally along the bed and 10-foot plastic standpipes were inserted to help view the level of the water in the bed. At each insertion point, water was found to be standing in the bed just a few inches below the soil surface. The contents of the septic tank were pumped out and removed by a commercial serviceman, and as much as possible of the effluent which had ponded in the bed was pumped out onto the alfalfa field using a self priming electrical bilge pump by droppng the intake hose into the distribution box through the vent pipe. Removal of the ponded water in this way did not cause a significant rise in the tensiometer reading, indicating that very little water was seeping through the soil layers below the bed. About 1.5 inches depth of water remained in the distribution box. The residual water in the rest of the bed was unknown. While approximately 500 gallons of clean water was being added through a garden hose into the vent pipe on the distribution box, 15 gallons (132 pounds) of standard grade (ca. 52%) hydrogen peroxide was siphoned in. Frothing could be seen and heard in the distribution box and in the stand-pipes. Within a few hours the tensiometer readings began to fall, indicating that the clogged/crusted layers of the soil had been perforated and water was moving into lower soil horizons underneath the bed. The fresh water actually drained from parts of the bed before effluent began flowing into the distribution box again after the tank refilled. As effluent began discharging into the bed again, the tensiometer fell after 7 days from an initial reading of 376 cm (before treatment) to 240 mm of mercury, the value for saturated flow in this type of soil. In time, the tensiometer rose again gradually to 280 mm after 3 months, when measurements were discontinued; some water was ponding in the distribution box, but the ends of the distribution system were still dry, where the standpipes had been inserted. The ends of the bed were still dry 12 months after treatment. The distribution box was not full, and no effluent was surfacing.

EXAMPLE 4

In another badly underdimensioned system on glacial till, effluent was spilling out over the top of a vent pipe at the lowest end of the disposal bed and forming a large surface pond in a hollow at that end of the system. A pit was dug and a tensiometer inserted in soil beneath the failed seepage bed about 15 feet from the vent pipe. The pit was closed, the 650 gallon septic tank emptied by a commercial pumper and the effluent from the bed pumped out onto a nearby pasture. The intake hose to the gasoline pump used was inserted into the vent pipe and later in a perforated 10-foot stand pipe inserted with a post hole digger and soil auger into the bed on the other side from the tensiometer. After pumping, the bed was filled with 20 gallons of standard grade 52% hydrogen peroxide, diluted with 500-600 gallons of water. Almost immediately the tensiometer reading began to fall from its initial value of 378 mm of mercury. After 3 days, the lowest value of 273 mm was recorded. In the following days and weeks the value rose gradually but remained quite steady at 280-282 mm. Thus, breakthrough of clogged/crusted layers causing failure of the system had been achieved. Because of heavy overloading of the system (750 gallons/day water use by a family of 16), water soon began to pond in the system again, as viewed in the standpipe. However, no water had resurfaced 3.5 months later, when the system was replaced by a larger tank and a sand filter.

As pointed out hereinbefore, the concentration and amount of hydrogen peroxide used is not critical. In all events, the concentration will be commensurate with safety in use, depending upon whether a professional in the business or a homeowner will handle the chemical, and with economy — the amounts will be sufficient to properly "open-up" the seepage bed and will obviously be dependent upon the size of the particular installation being treated. Repeated sequential applications can, of course, be made in the event a single application is insufficient to re-establish drainage in a bed. The hydrogen peroxide is convenient to use in concentrations from about 25% to about 65%. Concentrations lower than 25% can be readily used but are less economical particularly where shipping costs are involved. Concentrations higher than about 65% and up to 100% can be used but such higher concentrations present substantial safety hazards in shipment and use. In most cases, in the treatment of seepage beds, appropriate on-site dilutions should be made to substantially reduce the actual concentration of the hydrogen peroxide in the bed. Dilutions to a peroxide concentration in the bed of from about 1 to about 5% are eminently suitable.

Where hydrogen peroxide is to be used for the prophylactic treatment of seepage beds, as pointed out above, it may be desirable to utilize a stabilized form of the peroxide, i.e. where the peroxide solution has been stabilized against catalytic decomposition by, for example, borates or organic stabilizers. Such a stabilized composition is much less likely to exhibit localized foaming which is evidence of catalytic decomposition and which dissipates the available oxygen in the peroxide without optimum beneficial effects. Stabilized hydrogen peroxide solution are well known in the industry and may contain, as stabilizing agents, methanol, ethanol, glycerol, barbituric acid, boric acid, etc.

As pointed out above, other inorganic and organic peroxides such as sodium peroxide, barium peroxide, peroxyalkanoic acids, and alkyl hydroperoxides can be used in the place of hydrogen peroxide, as can other oxidizing agents such as oxygen or ozone, and even chlorine or oxychlorides. However, use of such materials are militated against by reason of their expense, difficulties in application and highly undesirable side effects. In circumstances where some or all of such disadvantages can be tolerated such oxidizing agents can be used instead of hydrogen peroxide.

Having thus described the invention what is claimed is:

1. A method for rehabilitating or improving the permeability of a septic tank effluent seepage bed, which has become at least partly inoperative because of blocking or clogging of the soil pores in such bed, which consists of treating said bed with hydrogen peroxide in an amount sufficient to increase the permeability and thereby the functionality of said bed.

2. The method of claim 1 wherein the hydrogen peroxide is used at a concentration of from about 25% to about 65% by weight.

3. A method of treating the clogged or crusted and ponded effluent seepage bed of a septic system containing in combination a septic tank with an effluent exit port, and effluent distribution box or manifold, effluent distribution lines emanating from said box or manifold and an effluent seepage bed associated with said distribution lines, which method consists of, pumping said septic tank to lower the liquid level in said tank substantially below the effluent exist port, substantially reducing the volume of water ponded in said seepage bed and treating said seepage bed with hydrogen peroxide in an amount sufficient to increase the permeability thereof and thereby its functionality.

* * * * *